United States Patent Office 2,832,463
Patented Apr. 29, 1958

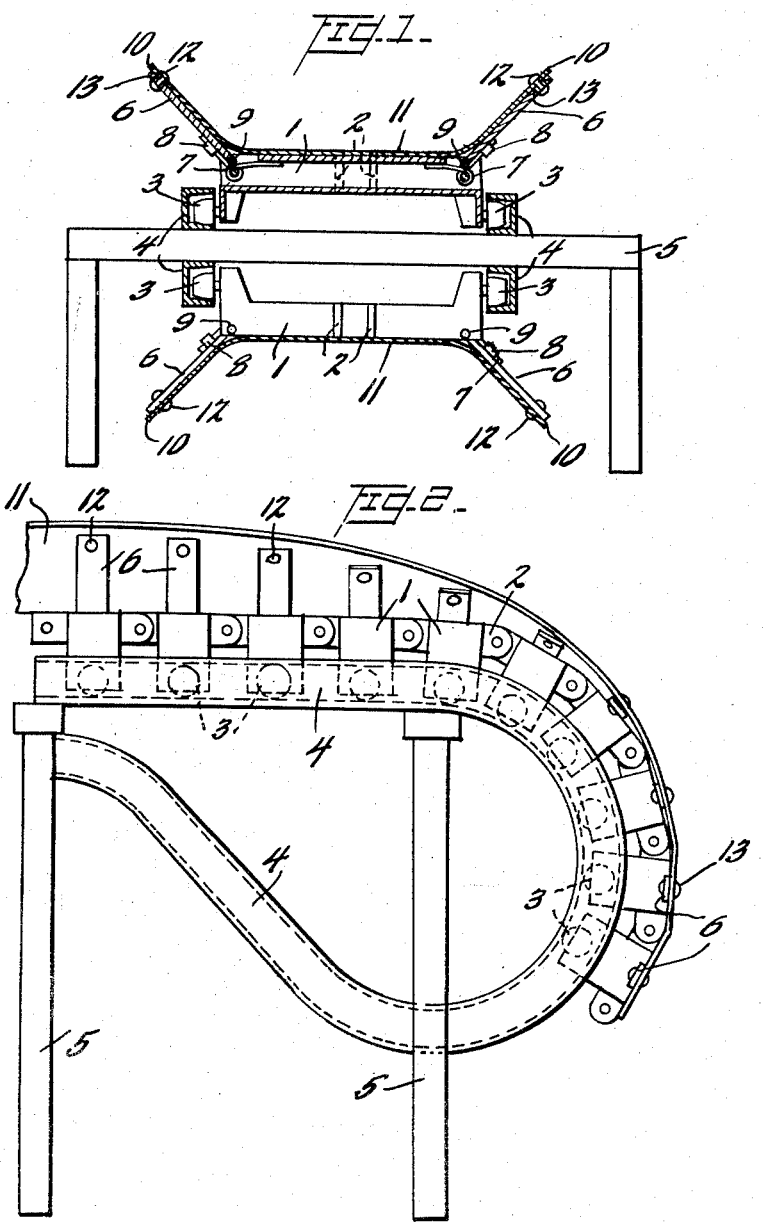

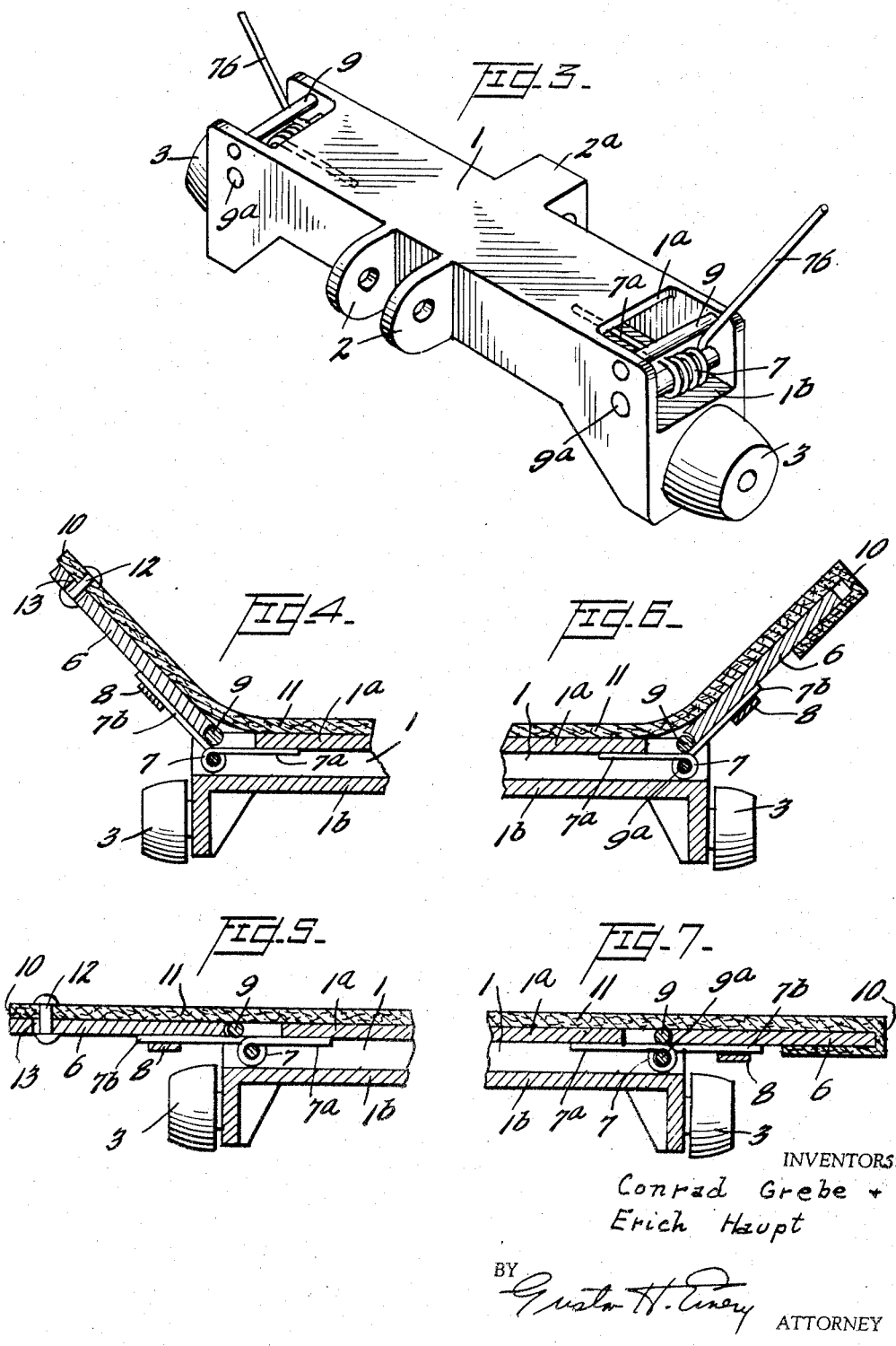

2,832,463

BAND CONVEYORS

Conrad Grebe and Erich Haupt, Wuppertal-Elberfeld, Germany

Application June 5, 1953, Serial No. 359,702

Claims priority, application Germany June 6, 1952

7 Claims. (Cl. 198—191)

This invention relates to band conveyors of the straight run and endless type and preferably power driven.

It is an object of the invention to provide a band or belt conveyor which on its upper run will have a curved or dish-shaped configuration in cross section to hold the material to be conveyed.

A further object of the invention resides in a belt conveyor having means along the longitudinal edges so that such edges or sides will automatically swing upwardly relative to the horizontal to form side portions or guards as a part of the belt.

A still further object of the invention resides in a belt structure in which the edges of the belt are provided with spring-pressed supporting elements which, on the end turns where the belt passes over the pulleys or guide tracks, will flatten the edges of the belt so that in cross section the belt will travel in a single plane.

A still further object of the invention resides in a structure in which a conveyor belt is provided with means along the edges thereof which normally are positioned to present a trough-like surface for the horizontal run of the belt but said edges will return to the plane of the remaining part of the belt during the traverse of the belt around the ends of the conveyor.

Further objects will be apparent from the following description when considered in connection with the accompanying drawing in which:

Figure 1 is a cross section through the conveyor,

Fig. 2 is a side elevation of one of the ends of the conveyor,

Figure 3 is a perspective view of one of the links of the conveyor belt,

Figure 4 is a cross section of a portion of the conveyor showing the attachment of the belt, Figure 5 is a view similar to Figure 4 showing the parts in a different position, Figure 6 is a cross section of a portion of the conveyor showing a modified attachment for the belt, and Figure 7 is a view similar to Figure 6 showing the parts in a different position.

The conveyor comprises a belt or band 11 which may be made of rubber or any other plastic material and which may include fabric reinforcements or other strengthening means. The conveyor may be mounted on any suitable frame 5 together with a pair of U-shaped tracks 4, of which there are two for each side as shown in Fig. 1. The conveyor is made up of a plurality of links 1 interconnected at 2 to form a chain at the center of the conveyor. A plurality of rollers 3 roll in the U-shaped tracks 4 during the movement of the band or belt 11 in the course of its travel over the horizontal portions, both top and bottom and around the ends.

Around the ends of the conveyor the belt 11 follows a flat plane contour which at the top gradually transforms itself into a trough shape as shown in Fig. 1. The belt is provided with a plurality of spaced slats 6 preferably of metal which may be slidably secured at each side of the belt by means of rivets 12 at the outer end. At the other end a spring 7 is guided at 8 to each slat and this spring is a coil spring to constantly urge the band 11 into a trough shape. Also, to limit the shape of the trough each link 1 is provided with a stop pin 9 against which each spring may abut so that the trough shape may be preserved even though there is no material being conveyed. 10 indicates the outer edge of each side of the band and as shown each rivet 12 passes through a bore hole 13 with clearance in the slat or rod 6.

It is believed that the operation of the conveyor will be quite apparent from the foregoing description in comparison with the drawing. Referring to Fig. 2, as the conveyor belt is operated by any suitable driving motor, not shown, the belt 11 at the extreme left is in its full trough shape as shown in Fig. 1. As the turn is approached, the trough becomes more shallow as the edge 10 gradually approaches the links 1 so that in the actual turn of the belt at the extreme right-hand end the belt is in a flat plane without any trough configuration, due to the fact that the belt 11 forces the slats down, Fig. 1, to a horizontal position against the action of the springs 7. After the turn has been completed the springs will force the slats 6 and the belt edges back to the trough configuration until the springs abut the stop pins 9.

Instead of securing the belt on the slats by rivets, it is possible to form a pocket on the underside edges so that each pocket will receive a slat and thus the belt will be secured on the conveyor chain.

The function and utility of the edge movements of the belt are many and varied. For instance, the material conveyed may fall more readily from the belt if the trough shape changes its contour to a plane or flat shape at the discharge end of the belt. Also, the belt may be more readily cleaned when the trough shape is modified as at the end turns of the belt in comparison with the runs of the belt. It will be observed that the belt itself is not directly driven but instead the links 1 are driven which latter are provided with cross members on which the belt is mounted and such cross members are guided by rollers 3 in the guide tracks 4.

Referring to Figures 3 to 7, Figure 3 shows the structure of a link 1 with lugs 2 and 2a on opposite sides and the roller 3 at each end. Also, each end has a cutout portion 1a with pins 9 and 9a secured in such a way as to support the springs 7. Each spring 7 has one arm 7b bearing against the stop pin 9 and another arm 7a bearing on the top part 1a.

Figures 4 and 5 show two positions of the side of the belt or band 11 with rivets 12 secured in holes 13 in the slot 6. The outer end 7b of the spring is secured by a retainer member 8 under the slot 6. Figures 4 and 5 show the raised and flat positions of the belt 11.

Figures 6 and 7 illustrate the modified srtucture of the securing means in the form of a pocket 10 on the edge of the belt.

Various modifications are possible, limited only by the scope of the appended claims.

We claim as our invention:

1. A conveyor comprising a pair of spaced track members, a frame to support the track members, a plurality of interconnected links each having rollers to contact and roll in the track members, a conveyor band provided on and supported by the links, a plurality of springs for each side of the conveyor bearing at one end on the links and the other end on the band to impart a normal trough shape to the band with upturned sides maintained in such position by the springs, said sides of the conveyor tending to move in a plane of the center part of the band against the force of the spring when the conveyor negotiates a vertical curve.

2. A conveyor according to claim 1, in which each spring forms a hinge for that part of the side of the band in the vicinity of the spring.

3. A conveyor according to claim 1, in which each link includes a cross piece extending on one side of the band and to which a pair of springs and rollers are secured.

4. A conveyor according to claim 1, in which a plurality of slats are provided spaced along the outer surface of each side of the links, and in which a plurality of spaced pockets are provided on the underside of the side parts of the band so that each slat projects into a respective pocket and each slat is secured to its respective spring.

5. A conveyor according to claim 1, in which the springs are secured to the track members in spaced relation, and in which a plurality of slats are provided spaced along the under surface of each side of the band with each slat fastened to the band and its spring.

6. A conveyor according to claim 1, in which the springs are secured to the track members in spaced relation, and in which a plurality of slats are provided spaced along the under surface of each side of the band with each slat fastened to the band and its spring, the slats being hinged to the respective track members and the slats maintaining the band normally in trough form.

7. A conveyor according to claim 1, in which the springs are secured to the track members in spaced relation, and in which a plurality of slats are provided spaced along the under surface of each side of the band with each slat fastened to the band and its spring, the band along each edge extending over and under a short distance to form a pocket into which the slats project.

References Cited in the file of this patent

UNITED STATES PATENTS

| | | |
|---|---|---|
| 968,211 | Vrooman | Aug. 23, 1910 |
| 999,419 | Van Wert | Aug. 1, 1911 |